Jan. 14, 1969  M. PEARSON  3,421,773
SPORT VEHICLE
Filed Oct. 24, 1967
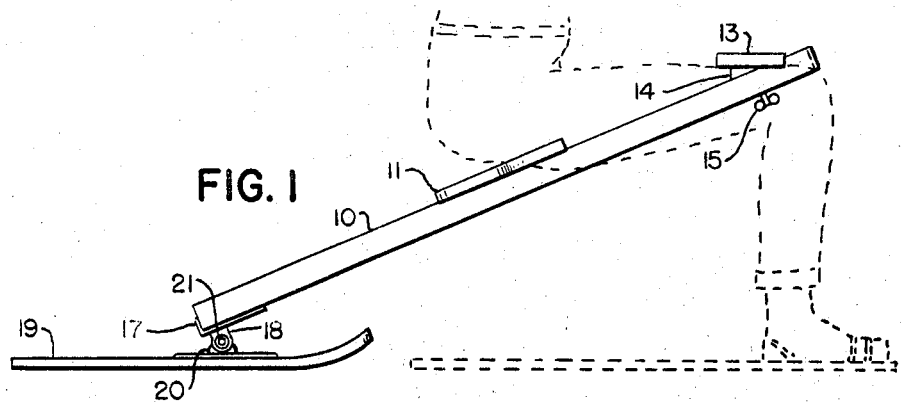
FIG. 1
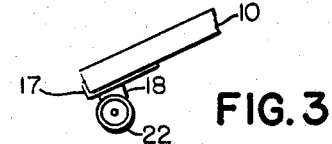
FIG. 3
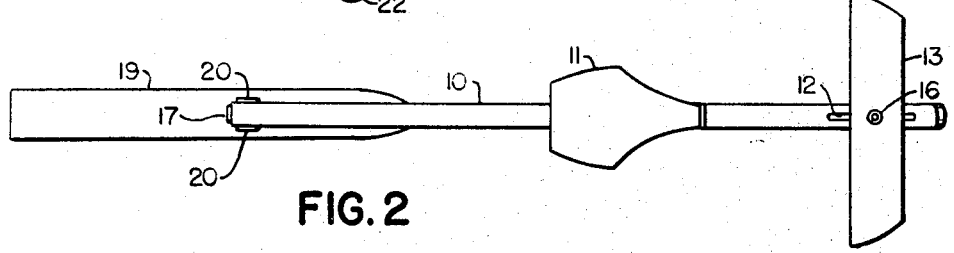
FIG. 2
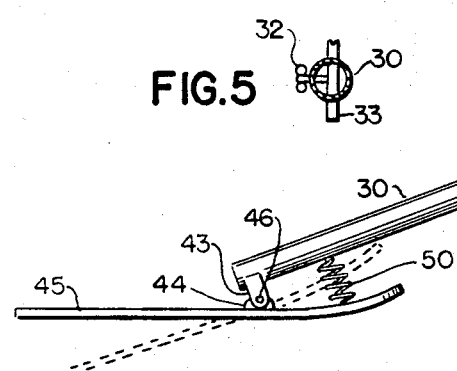
FIG. 5
FIG. 4
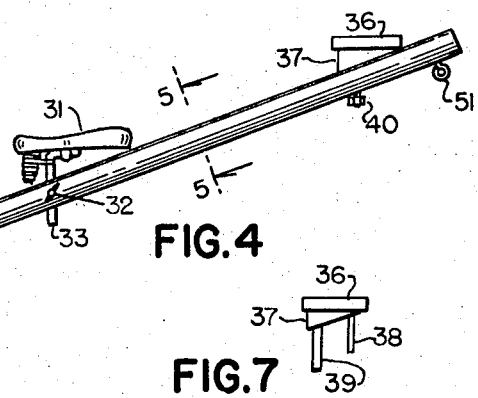
FIG. 7
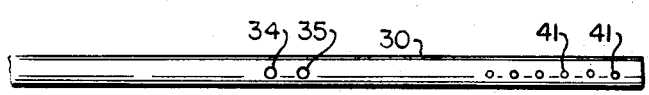
FIG. 6
*INVENTOR:*
MARTIN PEARSON

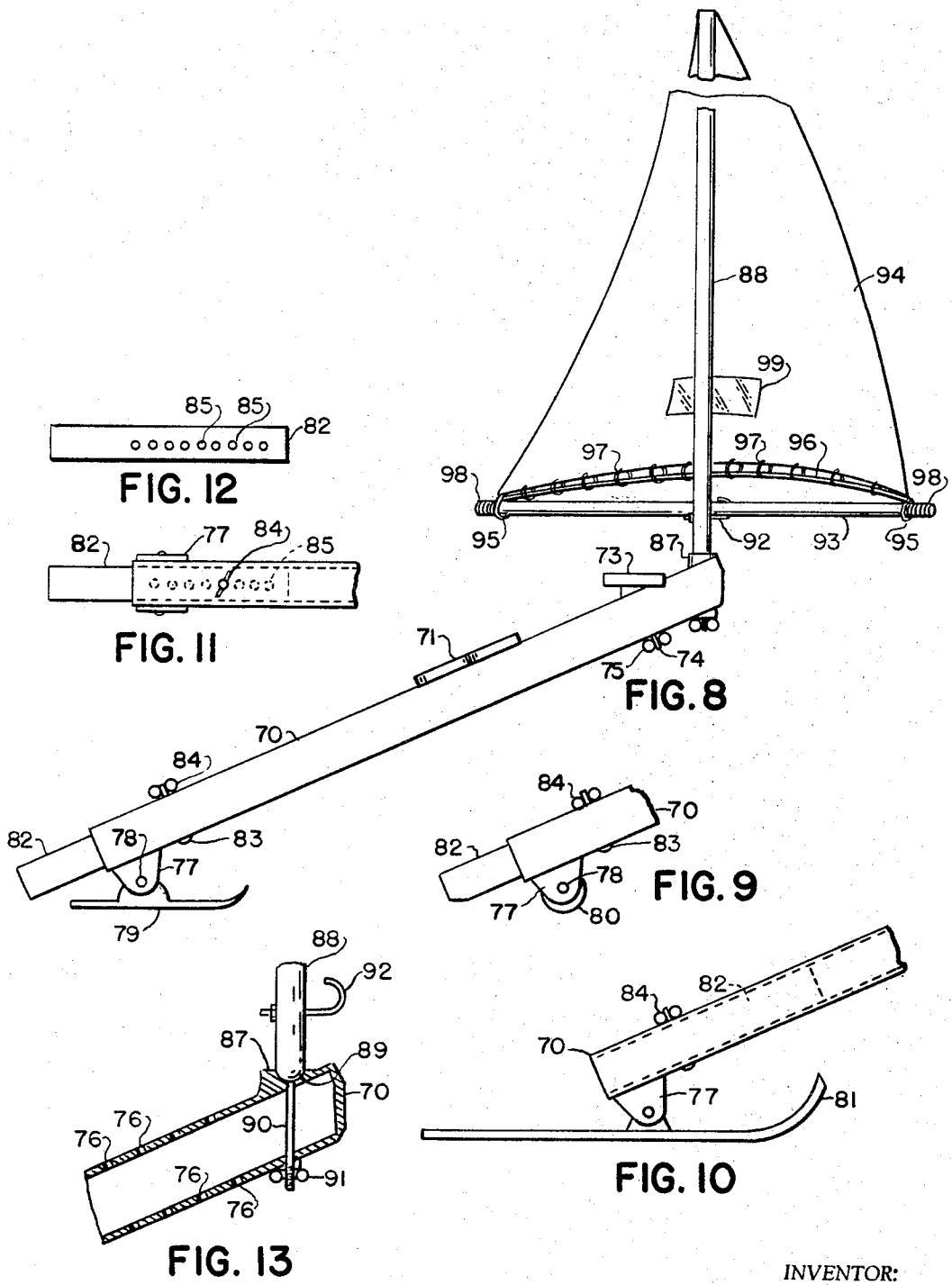

United States Patent Office 3,421,773
Patented Jan. 14, 1969

3,421,773
SPORT VEHICLE
Martin Pearson, 402 N. Village Ave.,
Rockville Centre, N.Y. 11570
Continuation-in-part of application Ser. No. 458,987,
May 26, 1965. This application Oct. 24, 1967, Ser.
No. 678,487
U.S. Cl. 280—11.39      1 Claim
Int. Cl. A63c 1/04

ABSTRACT OF THE DISCLOSURE

A sport vehicle having a shaft on which a rider sits wearing ice skates, skis, or roller skates, the shaft having a transverse knee rest resting on the knees of the rider to support the front end of the shaft, the back end of the shaft having means selectively mounting an ice skate blade, a ski, or wheels, an extendable brake block at the rear of said shaft to be forced against the ground by raising the front of said shaft, and a demountable sail at the front of said shaft.

Cross references to related applications

This application is a continuation-in-part of my co-pending application Ser. No. 458,987 filed May 26, 1965 and now abandoned.

Background of the invention

This invention provides an inexpensive and versatile sport vehicle which adds a new dimension of ease, comfort, enjoyment, and skill to the sports of ice skating, sail skating, roller skating, skiing, and water skiing. This invention provides a safer device of the type described in that a brake is provided for use with ice and roller skates which may be retracted for skiing. In addition, for use when desired, an easily removed sail with a unique construction is provided which allows a higher degree of control.

Summary of the invention

The sport vehicle of this invention has a hollow shaft on which a seat is provided for a rider to sit upon, the rider selectively wearing ice skates, roller skates, and skis, a transverse knee rest at the front end of said shaft, a single ice skate blade, a set of wheels, a ski, means selectively attaching said skate blade, said set of wheels, and said ski to the rear end of said shaft, a brake block telescoping within the rear end of said shaft, locking means adjustably positioning said brake block within said shaft and projecting from said shaft to be forced downward when the front of said shaft is raised by a rider, and a sail demountably fixed to the front end of said shaft.

Brief description of the drawing

FIGURE 1 is a side view of a coaster according to a first embodiment of my invention with the lower portion of a user shown seated thereon in dotted lines;

FIGURE 2 is a top view of the coaster shown in FIGURE 1;

FIGURE 3 is a side view of a fragment of the rear portion of the coaster shown in FIGURE 1 with roller skate wheels shown mounted thereon;

FIGURE 4 is a side view of a second embodiment of the coaster of my invention;

FIGURE 5 is a section taken on line 5—5 of FIGURE 4;

FIGURE 6 is a top view of the shaft of the coaster, shown in FIGURE 4, with its rear portion broken away and with the seat and knee rest removed;

FIGURE 7 is a side view of a knee rest removed from the coaster shown in FIGURE 4;

FIGURE 8 is a side view of a third embodiment of the coaster of my invention showing a brake and a sail attached for sail skating on ice;

FIGURE 9 is a side view of a rear fragment of the coaster of FIGURE 8 showing a set of wheels attached and showing the brake extended for roller skating;

FIGURE 10 is a side view of a rear fragment of the coaster of FIGURE 8 with a ski attached for water and snow skiing and showing the brake retracted;

FIGURE 11 is a top view of the rear portion of the coaster of FIGURE 8 showing the brake extended;

FIGURE 12 is a top view of the brake block used in the coaster of FIGURE 8; and

FIGURE 13 is a longitudinal vertical section through the front end of the shaft of the coaster of FIGURE 8 showing the broken away bottom portion of a mast attached thereto.

Description of the preferred embodiments

FIGURES 1–3 show a main shaft 10 of the first embodiment of my invention. Shaft 10 may be made from wood such as a bar of dressed oak or the like. A seat 11 is fixed by means of wood screws or the like to the center portion of shaft 10. Said seat may be shiftable along the shaft. A longitudinal slot 12 is formed in the front portion of shaft 10. Knee rest 13 has an inclined portion 14 which rests against shaft 10. A bolt 16 extends from knee rest 13 through slot 12 to have a wing nut 15 turned about it. Wing nut 15 may be loosened to position the knee rest along the length of the front portion of shaft 10; or the knee rest may be fixed under the shaft.

An angle bracket 17 or the like is fixed to the back or lower end of shaft 10 and has downwardly extending portions 18. A single short ski 19 has upwardly extending flanges 20 fixed to it. The flanges 20 are pivotally secured to the portions 18 of angle bracket 17 by means of a bolt or pin 21.

This invention may be used in the following manner. As shown in FIGURE 1, a user sits on seat 11 with knee rest 13 extending across his knees or lower thighs. The user's lower legs then support his weight comfortably in a seated position. The user, if a skier, wears short snow skis. The short snow ski 19 is fixed to main shaft 10 enabling even an inexperienced skier to negotiate difficult slopes and, in trials of this invention, jump a considerable distance.

As shown in FIGURE 3, roller skate or other wheels 22 may be mounted on bolt 21 to be substituted for the ski 19. This allows a user to wear roller skates and coast on this invention. In a like manner, a double or single runner ice skate (not shown) skid, or sledge runner can be substituted for the ski 19 so that an ice skater may use my invention.

Further adjustability may be provided by placing the knee rest 13 under shaft 10 or over shaft 10. This helps accommodate users of differing statures.

It is a feature of the invention that the snow ski 19 is secured by means of the flanges 20 considerably in front of its mid-point. This is particularly necessary so that, when hitting a bump or irregularity which throws ski 19 off the ground, the back end of ski 19 will fall downward to prevent the tip of ski 19 from digging into the snow. Thus, means for keeping the toe of the ski higher than the heel, such as the pivotal mounting of ski 19 in front of its center, is vital for the safe functioning of this invention. Such means may include a spring, rope or pivot stop.

Referring now to FIGURES 4–7, the second embodiment of my invention has a metal tubular shaft 30 to which a conventional bicycle seat 31 may be secured by means of the set screw 32 which is screwed into shaft 30 to contact seat post 33. This allows the seat 31 to be raised and lowered. Two apertures 34 and 35 are provided in shaft 30 to receive seat post 33 in different positions.

A knee rest 36 has a sloping under portion 37 to contact the top of shaft 30. A pin 38 and a threaded shaft 39 extend downward from the knee rest 36. A number of spaced apertures 41 are provided in the front portion of shaft 30. Pin 38 enters one aperture 41 while threaded shaft 39 extends through shaft 30 in an adjacent aperture 41. The knee rest is then secured in desired position by means of the nut 40.

Two downwardly extending flanges 43 from shaft 30 are disposed on each side of the pair of flanges 44 mounted on a ski 45. Thus, a bolt 46 may extend through the flanges 43 and 44 to secure ski 45 to shaft 30. This second embodiment of my invention may be used by a snow skier in the manner which has been described. In addition, with a suitable water ski 45, it may be used by a water skier.

To ensure that the toe of ski 45 does not dip forward to drag the entire apparatus under water, it must be pivotally mounted a short distance in front of its center to shaft 30 or provided wih other control of inclination. This will cause the ski to weathercock under a condition of fluid flow to assume the position shown in dotted lines in FIGURE 4. To ensure safety in water or snow skiing, a line or a tension spring 50 may be provided to extend between the front portion of ski 45 and shaft 30 to urge ski 45 into the position shown in dotted lines. A rotation stop may be provided on the pivot. An eyelet 51 may be provided for towing purposes if desired.

The tubular second embodiment of my invention may be filled with styrofoam or the like so that it will float if used for water skiing. The wooden first embodiment of my invention will float without any special provision.

Referring now to FIGURES 8–13, the third embodiment of my invention has a tubular shaft 70 of rectangular section with a seat 71 attached thereto. A wingnut 75 screwed about bolt 74 secures the knee rest 73 transversely across the front end of the shaft 70. As shown in FIGURE 13, the knee rest 73 may be adjustably positioned along shaft 70 by passing bolt 74 through any one of the pairs of longitudinally spaced apertures 76.

A bracket 77 is welded or otherwise secured to extend below the rear end of shaft 70. By means of a bolt 78, a skate blade 79, a wheel set 80, or a ski 81 may be selectively attached as desired to bracket 77. A brake block 82 is telescoped into the rear end of shaft 70 and held in a desired position by means of bolt 83 and wingnut 84. The brake block 82 may be retracted as shown in FIGURE 10 for skiing or extended for roller and ice skating as shown in FIGURES 9 and 8 by passing bolt 83 through a suitable one of the longitudinally spaced apertures 85. The brake 82, when being used while roller or ice skating, should be extended so that it just clears the ground or ice. Thus, it should be extended according to wear and according to the legs of a rider. The brake 82 is applied by raising the front of the shaft 70 to force the tip of the brake block 82 into the ground or the ice. This is a very effective brake whether the brake block 82 is made of wood or metal.

As shown in FIGURES 8 and 13, a socket 87 is welded or otherwise formed on the top front of shaft 70. A mast 88 with a rounded lower end 89 and a bolt 90 extending therefrom is seated in socket 87 and releasably secured therein by means of the wingnut 91 turned about bolt 90. Mast 88 has a hook 92 extending from its lower portion to pivotally secure the center of the spar 93. A triangular sail 94 has its upper corner secured at the top of mast 88 and has its lower corners fixed to the rings 95 which encircle spar 93. A flexible control member 96 is fixed to the lower edge of sail 94 by rings 97 and has its ends also fixed to the rings 95. End grip portions 98 of the spar 93 prevent the rings 95 from slipping from the spar 93 and they provide a good hand grip. When wind fills the sail 94 as shown, control member 96 flexes to relieve strain on the sail 94 as the rings 95 slide inward along spar 93. A window 99 of transparent material may be provided to allow visibility when sailing with ice or roller skates.

What is claimed is:

1. A sport vehicle for use by a rider selectively wearing ice skates, roller skates, and skis, said sport vehicle comprising, in combination: a hollow shaft having a front and a rear end; a seat disposed longitudinally on said shaft for a rider to sit thereon; a transverse knee rest on the front end of said shaft to rest on the knees of a rider and support the front end of said shaft; sail means fixed to the front end of said shaft in front of said knee rest, said sail means comprising a mast demountably secured to extend upward from said shaft, a horizontal spar pivotally secured at its center to the lower portion of said mast, a flexible control member slidably fixed by its ends to said spar, and a triangular sail having an upper corner fixed to the top of said mast and having a lower edge fixed to said flexible control member; means for selectively attaching one of an ice skate blade, a ski and a set of wheels to and below the rear end of said shaft; a brake block telescoping into the rear end of said shaft; and means adjustably securing said brake block to project rearwardly from said shaft to be forced downward when the front end of said shaft is raised by a rider.

References Cited

UNITED STATES PATENTS

| | | | |
|---|---|---|---|
| 1,461,020 | 7/1923 | Barr | 280—11.39 |
| 1,585,160 | 5/1926 | Lowell et al. | 280—11.39 |
| 1,981,317 | 11/1934 | Jaglowicz | 280—11.39 |
| 1,985,726 | 12/1934 | Heldman | 280—11.39 |
| 2,027,388 | 1/1936 | Larkin | 280—11.39 |
| 2,148,644 | 2/1939 | Riefschnider | 280—11.39 |
| 2,781,200 | 2/1957 | Robison | 280—11.39 |
| 2,814,811 | 12/1957 | Ritter et al. | 280—16 XR |

BENJAMIN HERSH, *Primary Examiner.*

MILTON L. SMITH, *Assistant Examiner.*

U.S. Cl. X.R.

9—310